US006813264B2

(12) United States Patent
Vassilovski

(10) Patent No.: US 6,813,264 B2
(45) Date of Patent: Nov. 2, 2004

(54) SYSTEM AND METHOD FOR ROUTING VOICE OVER IP CALLS

(75) Inventor: Dan Vassilovski, Del Mar, CA (US)

(73) Assignee: Qualcomm, Incorporated, San Diego, CA (US)

(*) Notice: Subject to any disclaimer, the term of this patent is extended or adjusted under 35 U.S.C. 154(b) by 205 days.

(21) Appl. No.: 10/005,773

(22) Filed: Nov. 2, 2001

(65) Prior Publication Data

US 2003/0086411 A1 May 8, 2003

(51) Int. Cl.[7] .............................................. H04G 12/56
(52) U.S. Cl. ....................... 370/352; 370/355; 370/401
(58) Field of Search ................................ 370/328, 329, 370/335, 342, 352, 354, 355, 356, 390, 401

(56) References Cited

U.S. PATENT DOCUMENTS

| 6,392,999 B1 | * | 5/2002 | Liu et al. ................... 370/260 |
| 6,445,695 B1 | * | 9/2002 | Christie, IV ............... 370/352 |
| 6,477,150 B1 | * | 11/2002 | Maggenti et al. ........... 370/312 |
| 6,556,547 B1 | * | 4/2003 | Srikanth et al. ............ 370/317 |
| 6,567,398 B1 | * | 5/2003 | Aravamudan et al. ...... 370/352 |
| 6,584,093 B1 | * | 6/2003 | Salama et al. .............. 370/351 |
| 6,625,141 B1 | * | 9/2003 | Glitho et al. ............... 370/352 |

FOREIGN PATENT DOCUMENTS

| CA | 2131349 | 5/1995 |
| WO | 9912329 | 3/1999 |
| WO | 0033549 | 6/2000 |
| WO | 0062489 | 10/2000 |

* cited by examiner

*Primary Examiner*—Wellington Chin
*Assistant Examiner*—William Schultz
(74) *Attorney, Agent, or Firm*—Sandip (Micky) S. Minhas; Philip Wadsworth

(57) ABSTRACT

An SIP server in an IP-based infrastructure supporting wireless telephones determines whether, based on the destination address in a call request, the call is an intrasystem call or an intersystem call. For intrasystem calls the SIP server routes VOIP packets directly between the originating and destination devices. For intersystem calls, however, and in particular encrypted calls, instead of routing the VOIP packets through the public Internet, the SIP server instantiates a circuit-switched call using a local modem bank connected to the PSTN. In this way, quality of service assurance is obtained and latency reduced.

13 Claims, 3 Drawing Sheets

SYSTEM AND METHOD FOR ROUTING VOICE OVER IP CALLS

FIELD OF THE INVENTION

The present invention relates generally to providing quality of service assurance over non-wireless portions of a wireless voice over Internet Protocols (VOIP) system, and to locating and connecting to destination devices outside of a serving cell site.

Background of the Invention

Wireless telephones, such as but not limited to wireless telephones that communicate using Code Division Multiple Access (CDMA) spread spectrum modulation techniques, communicate over the air with system infrastructure using wireless telephone over-the-air communication protocols, e.g., the CDMA protocols known as IS-95A, IS-95B, and IS-2000. The system infrastructure, which can include base stations (BTS), base station controllers (BSC), and other components, connects the wireless telephone to another communication device, such as a through land line or another wireless communication system.

With the growth of the Internet, computer-to-computer communication using Internet Protocols (IP) has become ubiquitous. Furthermore, it has become desirable not only to facilitate computer data communication using IP, but to facilitate voice communication using IP as well. As but one advantage afforded by using IP in a telephony infrastructure, much hardware such as switches can be eliminated, and existing computers and software can be used instead, reducing cost. To this end, so-called voice over IP (VOIP) has been introduced. As recognized herein, however, VOIP data is latency-sensitive (i.e., it is desirable that voice data not be unduly delayed in transmission between people conversing with each other).

To connect an originating device with a destination device, an auxiliary IP-based protocol known as Session Initiation Protocol (SIP) is used. Using a protocol such as SIP, a wireless device is associated with an IP address and a unique identifying alphanumeric packet address, such as "sip://MY_PHONE@qualcomm.com." An SIP server functions as a directory of endpoints and their associated IP addresses and packet addresses. Accordingly, to participate in IP-based communication such as VOIP, a device must register its IP address with the SIP server. When an originating device requests a connection to an IP-based destination device, the SIP server either gives the destination IP address to the originating device, or it establishes a connection with the destination device and then acts as a proxy for the originating and destination devices.

In any case, when an originating device places a call to a destination device in the same service system (an "intrasystem" call), an SIP server that may be associated with the system knows both addresses and consequently establishes, perhaps using one or more options such as an "encryption" option, an IP connection between the two devices. On the other hand, if the destination device is not in the same wireless service system as the originating device (an "intersystem" call), its address will not appear in the SIP server database, and the SIP server consequently forwards the call request to other SIP servers until the destination address is located or until the request times out.

As recognized by the present invention, because the transmission of packets is IP-based, intrasystem calls and intersystem calls in particular can result in transmitting packets over publicly-accessible portions of the Internet, resulting in unpredictable and potentially fluctuating delays. In the case of latency-intensive applications such as VOIP, this can severely compromise performance, since a calling party might experience undue delays in having his voice heard by a called party and vice-versa.

Standard voice-over-IP telephony calls originated to destinations within the same service system are connected to the destination party using Internet Protocol (IP) routing techniques with the assistance of a SIP server, as noted above. VOIP telephone calls originated to destinations outside of the originating service system to destinations on the PSTN require format conversion at the boundary of the originating packet system (the "intranet") and the PSTN. A "VOIP gateway" is a device well known in the art that converts between VOIP and PSTN formats. In order to perform this conversion, the VOIP gateway requires knowledge of the voice encoding and voice call signaling used within the originating IP system (intranet). Hence, VOIP systems employ standardized voice encoding techniques. Another case of VOIP calls of increasing interest are encrypted VOIP calls. Encrypted VOIP calls use voice encoding involving exchange of encryption establishment information between the two (or more) participating phones, and subsequent exchange of encrypted voice packets. These encrypted voice packets are not understood by VOIP gateways, and must be exchanged between the participating phones using a data network. In other words, an end-to-end data connection is required between the participating phones. Having made the above critical observations, the present invention provides the solutions disclosed herein.

SUMMARY OF THE INVENTION

A voice over Internet (VOIP) system includes an IP-based infrastructure component communicating with a wireless communication originating device. An SIP server communicates with the infrastructure component, and a modem bank is associated with the SIP server and is connected to the PSTN. The SIP server selectively uses the modem bank to instantiate a circuit-switched call from the originating device to a destination device. In a preferred embodiment, the SIP server instantiates circuit-switched calls only for intersystem calls requiring voice-call-latency characteristics and end-to-end data connectivity, as might be indicated by, e.g., an address or portion thereof of the destination device not being registered with the SIP server, and/or specific SIP call setup parameters. Thus, the SIP server does not instantiate a circuit-switched call for an intrasystem call, e.g., a call to a destination device currently served by the same intranet as the originating device.

In a particularly preferred non-limiting embodiment, the destination device has an IP address of the form "sip://DN@service.com", and the circuit switched call is instantiated using the DN portion of the IP address. In one embodiment, the SIP server maps the DN to the modem bank and completes the call through the PSTN. Additional information conveyed, potentially including optional SIP call parameters, can be used to identify a VOIP call as a secure call requiring instantiation of the circuit switched call.

In another aspect, a method for VOIP includes receiving, from an originating wireless device in a first service system, a call request for a destination device that has an IP address. The method then determines whether the destination device is in the first service system. If the destination device is in the first service system, communication is established between the originating device and destination device within the first service system without using the public Internet. Otherwise, a circuit-switched call is established between the destination device and originating device using the PSTN, particularly if the call is encrypted. In neither case are Internet connections which potentially are subject to unpredictable delays, such as the publicly accessible portions of the Internet, used to complete the VOIP call.

In still another aspect, a computer program device includes means for receiving a call request at an SIP server. The call request is generated by a wireless communication originating device, and it indicates a destination device. The program device also includes means for determining whether the destination device is registered with the SIP server. Means are provided for transmitting IP packets between the destination device and originating device without using the public Internet when the destination device is registered with the SIP server. Also, however, means are provided for transmitting IP packets between the destination device and originating device using an instantiated circuit-switched connection when the destination device is not registered with the SIP server, and perhaps only when the call is encrypted.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
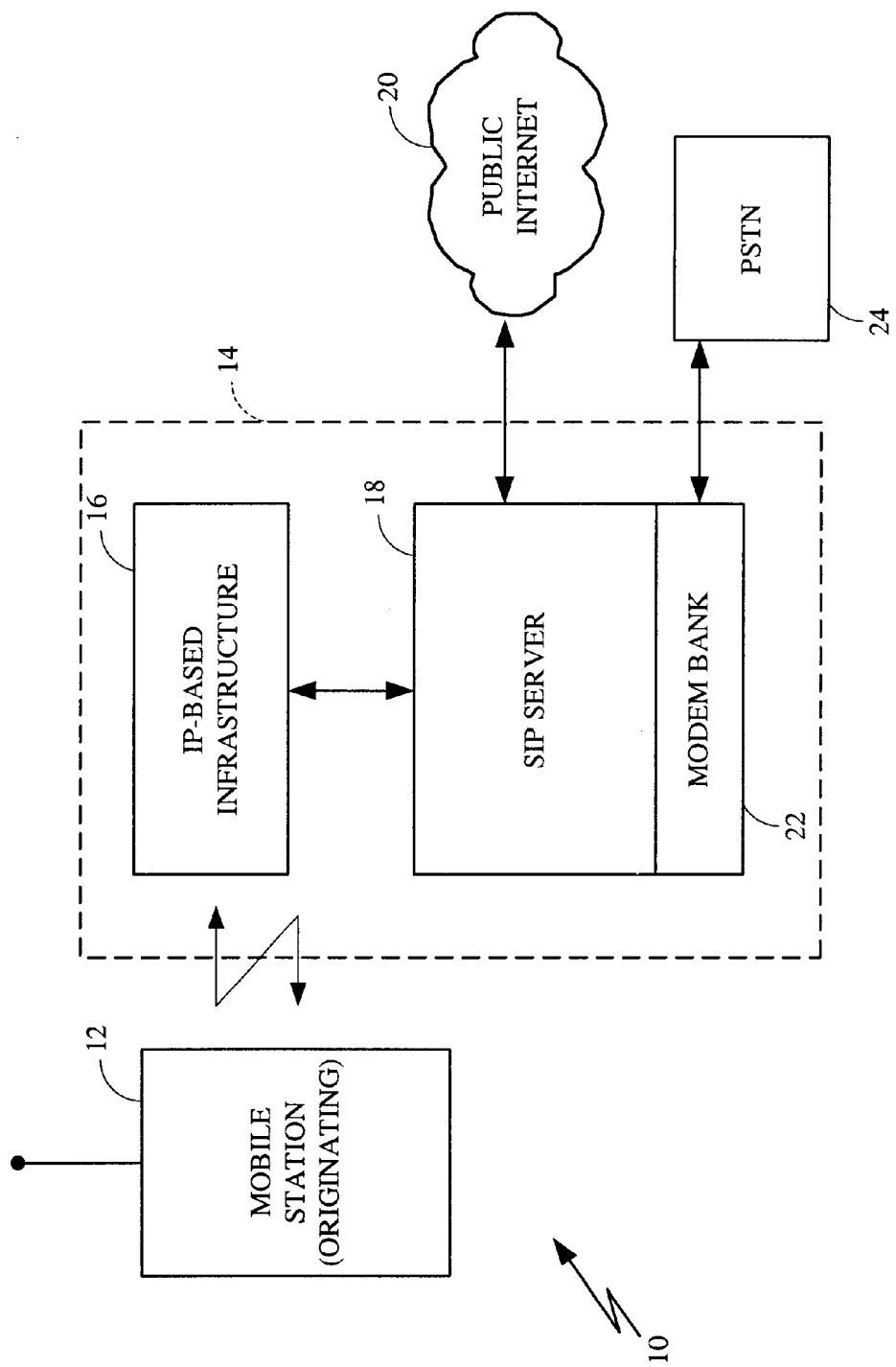
FIG. 1 is a block diagram of a presently preferred inventive wireless communication system.

Referring initially to FIG. 1, a system is shown, generally designated 10, for effecting communication between an originating wireless communication device 12 and a destination communication device using an IP-based telephony infrastructure 14. The infrastructure 14 generally is not part of the publicly-accessible Internet. In one non-limiting embodiment the device 12 is a mobile telephone made by Kyocera, Samsung, or other manufacturer that uses Code Division Multiple Access (CDMA) principles and CDMA over-the-air (OTA) communication air interface protocols such as defined in but not limited to IS-95A, IS-95B, UCDMA, IS-2000, and others to communicate with the infrastructure 14.

For instance, the wireless communication systems to which the present invention can apply, in amplification to those noted above, to Personal Communications Service (PCS) and cellular systems, such as Analog Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-98. Other communications systems are described in the International Mobile Telecommunications System 2000/ Universal Mobile Telecommunications Systems (IMT-2000/ UM), standards covering what are referred to as wideband CDMA (WCDMA), cdma-2000(such as cdma2000 1x or 3x standards, for example) or TD-SCDMA.

The present invention applies to any wireless communication device 12; for illustration it will be assumed that the device 12 is a telephone 12. In general, wireless communication devices to which the present invention applies may include but are not limited to a wireless handset or telephone, a cellular phone, a data transceiver, or a paging and position determination receiver, and can be hand-held, or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

As shown in FIG. 1, the wireless telephone 12 communicates, using one or more of the above-mentioned systems, with at least one first infrastructure component 16 that accesses an SIP server 18 that executes the logic of the present invention. The first component 16 preferably is a base station (BTS), but it can also be implemented by base station controller (BSC), mobile switching center (MSC), gateway to a satellite system, or other infrastructure component or combination of two or more of the above. In any case, the first component 16 not only supports the necessary protocols and systems to communicate with the wireless device 12, but also supports IP and attendant protocols or stack of IP protocols.

As shown in FIG. 1, the SIP server 18 communicates with publicly-accessible portions of the Internet 20. Also, a modem bank 22 is associated with the SIP server 18. The modem bank 22 can embody a VOIP gateway to the public switched telephone network (PSTN) 24 using a signaling protocol such as ISUP and using a physical system such as SS7.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer, controller, processor, etc.) to perform a sequence of function steps corresponding to those shown.

In other words, the logic may be embodied by a computer program that is executed by a processor within, e.g., the SIP server 18 as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated.

Figure 2:
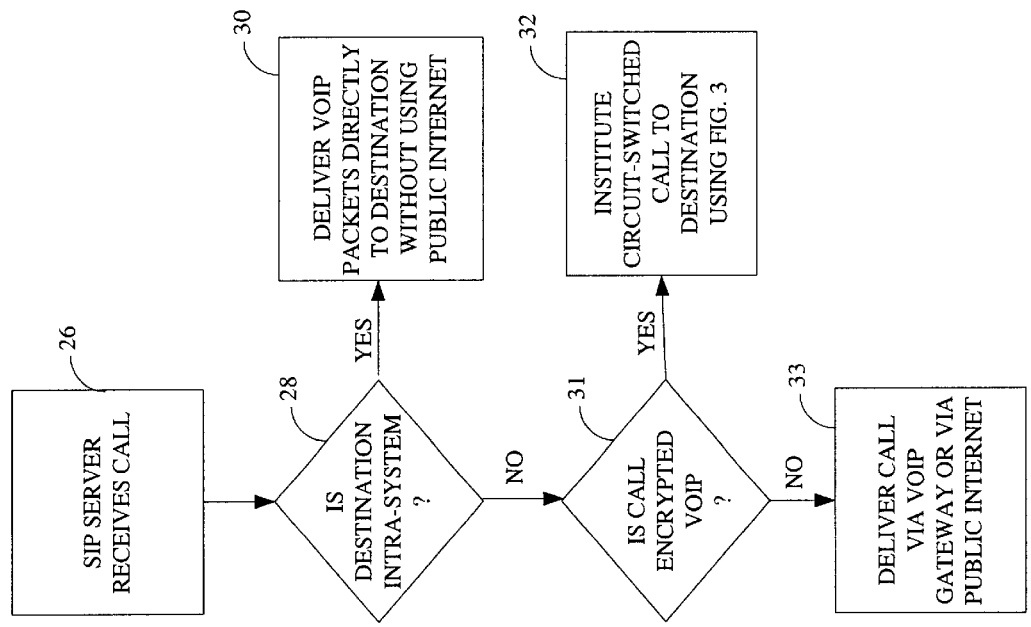
FIG. 2 is a flow chart of the overall logic used in the system shown in FIG. 1.

Now referring to FIG. 2, the logic that is executed when a call is placed by the originating device 12 is shown. Commencing at step 26, the call is received by the SIP server 18. Moving to decision diamond 28, it is determined whether the call is an intersystem call or an intrasystem call. One way to make this determination is to determine whether the IP address of the destination device is registered with the SIP server 18. If it is registered with the SIP server 18, an intrasystem call is indicated, and the logic flows to step 30 to deliver VOIP packets directly to the destination device through the infrastructure 14 without using the public Internet 20.

In contrast, when the destination device address is not registered with the SIP server 18, i.e., when an intersystem call is otherwise indicated, the preferred non-limiting logic flows from decision diamond 28 to decision diamond 31 to determine whether the call is an encrypted VOIP call. If it is, the logic moves to step 32, wherein a circuit-switched call to the destination device is instantiated through the modem bank 22 and PSTN 24 using the logic shown in FIG. 3. Thus, transmission of data packets through the public Internet 20 is avoided for encrypted calls, and point-to-point communication is established. That is, instantiation of the circuit-switched call might be made in response to one or more predetermined SIP options, such as "encrypted", i.e., the circuit-switched call might be instantiated only for encrypted VOIP calls and not for unencrypted VOIP calls, if desired, although all intersystem calls can be so treated. In the preferred logic shown in FIG. 2, however, if the intersystem call is not encrypted, at step 33 the logic delivers the call through a conventional VOIP gateway or via the public Internet 20.

Figure 3:
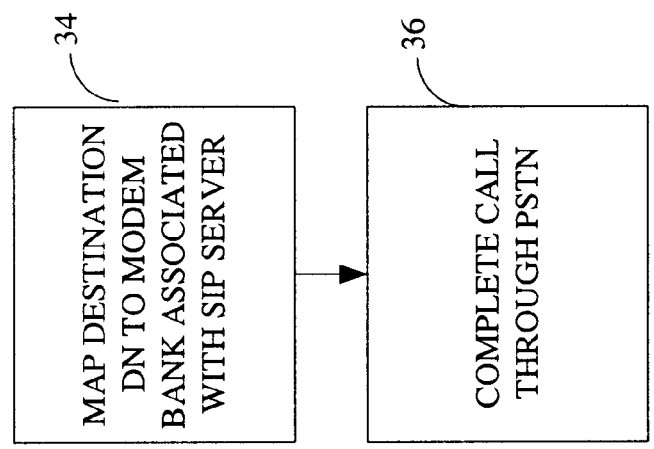
FIG. 3 is a flow chart of the circuit switched call instantiation logic.

Now referring to FIG. 3, a first implementation of the circuit-switched call instantiation logic is shown. Commencing at step 34, the DN of the destination device is mapped to the modem bank 22. For instance, for a device having an SIP address of "sip://DN@qualcomm.com", the DN portion of the address is mapped to the modem bank 22. Then, at block 36 the call is completed through the PSTN 24 using the modem bank 22. As mentioned above, this can be undertaken based on additional SIP information in the call, such as "encrypted" call, indicating that the call is encrypted.

While the particular SYSTEM AND METHOD FOR ROUTING VOICE OVER IP CALLS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act."

What is claimed is:

1. A voice over Internet (VOIP) system, comprising:
    at least one IP-based infrastructure component communicating with at least one wireless originating device;
    at least one SIP server communicating with the infrastructure component; and
    at least one modem bank associated with the SIP server and connected to a PSTN, the SIP server selectively using the modem bank to instantiate a circuit-switched call for encrypted intersystem calls from the originating device to a destination device.

2. The system of claim 1, wherein the SIP server initiates the instantiation of a circuit-switched call to the destination device when an address or portion thereof of the destination device is not in the same system as the originating device.

3. The system of claim 1, wherein the SIP server does not instantiate a circuit-switched call for an intrasystem call.

4. The system of claim 1, wherein the SIP server does not instantiate a circuit-switched call to a destination device having an address or portion thereof registered with the SIP server.

5. The system of claim 2, wherein the circuit switched call is instantiated using DN portion of IP address.

6. The system of claim 5, wherein the SIP server maps the DN to the modem bank and completes the call through the PSTN.

7. The system of claim 1, wherein at least the originating device uses CDMA principles.

8. A method for VOIP, comprising:
    receiving from an originating wireless device in a first service system a call request for a destination device having an IP address;
    determining whether the destination device is in the first service system;
    if the destination device is in the first service system, establishing VOIP communication between the originating device and destination device within the first service system for encrypted calls without using the public Internet; otherwise:
    establishing a circuit-switched VOIP call between the destination device and originating device using the PSTN.

9. The method of claim 8, wherein the determining act is undertaken based on the IP address of the destination device.

10. The method of claim 8, comprising mapping at least a DN of the destination device to the modem bank and completing the call through the PSTN.

11. The method of claim 8, wherein at least the originating device uses CDMA.

12. A computer program device, comprising:
    means for receiving a call request at an SIP server, the call request being generated by a wireless communication originating device and indicating a destination device;
    means for determining whether the destination device is registered with the SIP server;

means for transmitting IP packets between the destination device and originating device without using the public Internet when the destination device is registered with the SIP server; and means for transmitting IP packets between the destination device and originating device using an instantiated circuit-switched connection for encrypted calls when the destination device is not registered with the SIP server.

13. The device of claim 12, wherein the means for transmitting IP packets between the destination device and originating device using an instantiated circuit-switched connection includes means for mapping at least a DN of the destination device to the modem bank and completing the call through a PSTN.

\* \* \* \* \*